United States Patent Office 3,555,029
Patented Jan. 12, 1971

3,555,029
AZECINO[2,1-a]TETRAHYDROISOQUINOLINES AND PROCESS FOR THEIR PRODUCTION
John Shavel, Jr., Mendham, Marx von Strandtmann, Rockaway, and Chester Puchalski, Dover, N.J., assignors to Warner-Lambert Pharmaceutical Company, Morris Plains, N.J., a corporation of Delaware
No Drawing. Filed July 31, 1967, Ser. No. 657,086
Int. Cl. C07d 39/00
U.S. Cl. 260—286
15 Claims

ABSTRACT OF THE DISCLOSURE

The present invention relates to compounds of the formula:

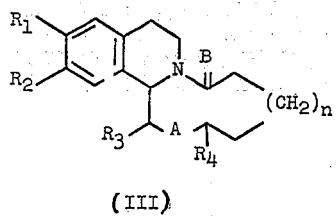
(III)

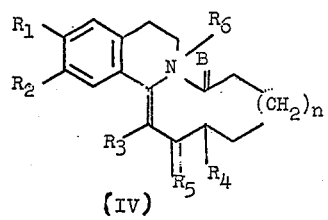
(IV)

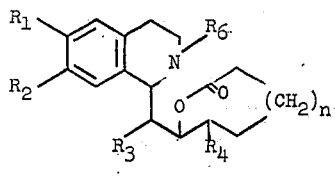
(V)

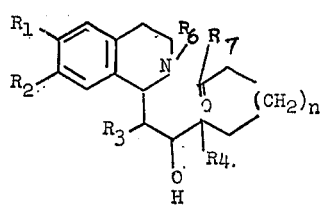
(VI)

wherein B is oxygen or hydrogen; A is >CHOH, >CHOSO$_2$C$_6$H$_4$CH$_3$, >C=O, >CH$_2$, >C=NOH, >C=NOCOCH$_3$, >CONH; R$_1$ and R$_2$ are hydrogen, lower alkoxy, hydroxy, or if taken together, methylenedioxy; R$_3$ is hydrogen, halogen, lower alkyl, aralkyl, lower alkoxy; R$_4$ is alkyl, aralkyl, aryl, carboalkoxy, halogen; $n$ is 1–20; R$_5$ is >C=O or >C=NOH; R$_6$ is hydrogen, acyl or tosyl; R$_7$ is hydroxy, lower alkoxy, amine, lower alkylamine and aralkylamine. These compounds are useful as antihypertension agents.

The present invention relates to certain isoquinoline derivatives and more particularly this invention relates to azecino[2,1-a]tetrahydroisoquinolines having the formula:

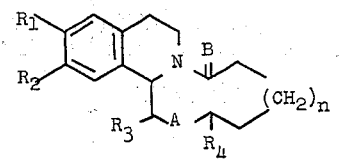
(III)

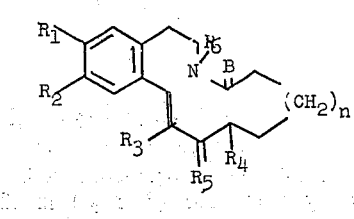
(IV)

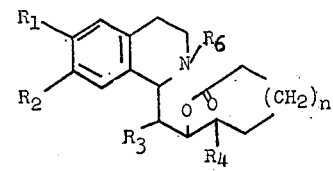
(V)

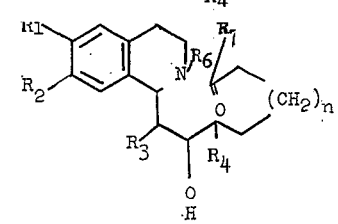
(VI)

wherein B is oxygen or hydrogen; A is >CHOH,

>CHOSO$_2$C$_6$H$_4$CH$_3$

>C=O, >CH$_2$, >C=NOH, >C=NOCOCH$_3$,

>CONH

R$_1$ and R$_2$ are hydrogen, lower alkoxy, hydroxy, or if taken together, methylenedioxy; R$_3$ is hydrogen, halogen, lower alkyl, aralkyl, lower alkoxy; R$_4$ is alkyl, aralkyl, aryl, carboalkoxy, halogen; $n$ is 1–20; R$_5$ is >C=O or >C=NOH; R$_6$ is hydrogen, acyl or tosyl; R$_7$ is hydroxy, lower alkoxy, amine, lower alkylamine and aralkylamine.

In the above definitions for R$_1$, R$_2$, R$_3$, and R$_4$ lower alkyl in the lower alkyl portion of lower alkoxy is meant to include from 1 to 6 carbon atoms such as methyl, ethyl, propyl, isopropyl, butyl, isobutyl and the like; aryl is meant to include both monohomocyclic systems such as phenyl and mono-, heterocyclic systems such as pyridyl, furyl, and the like; halogen is meant to include all four members of its family that is fluorine, bromine, iodine, and chlorine. Acyl is a residue of a carboxylic acid preferably that of a lower alkanoyl acid, for example, acetyl, propionyl and the like, or benzoyl.

The present invention also embraces within its scope, pharmaceutical dosage forms containing the above compounds as their active ingredients, as well as novel processes for the production of the above compounds.

The compounds of this invention have a pharmacological profile similar to guanethidine exhibiting guanethidine-like activity in a mammalian body and are accordingly useful in the treatment of hypertension. Generally speaking, they are used in a similar manner as guanethidine. In order to use these compounds as antihypertension agents, they are combined with an inert pharmaceutical carrier such as lactose, mannitol, dicalcium phosphate, or other standard diluents and excipients to form dosage forms such as tablets, dispersible powders, and the like. They may also be combined with a liquid vehicle such as isotonic saline, sterile water, and the like, to form dosage forms suitable for parenteral administration. Generally, a daily dose of about 25 to 100 mg. is recommended to produce the desired antihypertensive effects. Additionally, the compounds of this invention exhibit inotropic activity in the mammalian cardiovascular system and therefore they are also useful as agents in relieving arrythmias and angina pectoris.

According to the process of this invention, the above compounds of type III where A is >C=O and B is =O

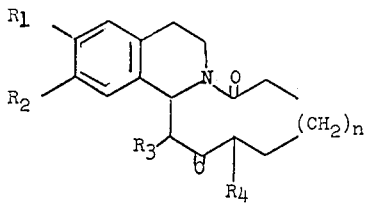

may be prepared by reacting Compound I and Compound II

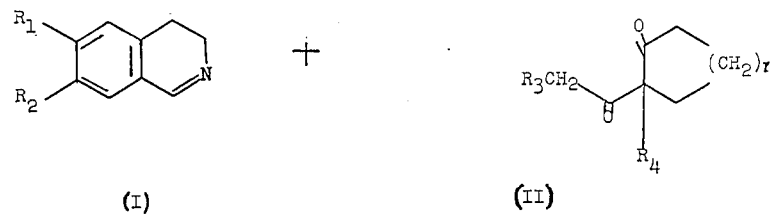

(I)            (II)

Generally, the reaction can be effected at the temperature of from about 80 to 100° C. in a lower molecular weight alcohol, for example, ethanol or water. This reaction is described in detail in Examples 1–5. Starting materials I may be prepared according to procedures cited by R. C. Elderfield in Heterocyclic Compounds, vol. 4, p. 349, published by J. Wiley & Sons of New York (1952). Starting materials II can be obtained by methods cited by H. Henceka in "Chemie der Beta-Dicarbonyl-Verbindungen" p. 29, Springer Verlag Berlin, 1950.

Compound III obtained by above described procedure is then subjected to well-known chemical reactions. These are, oxime formation described in Example 6; reductions with complex metal hydrides, described in Examples 7–11; acylation or tosylation described in Examples 12–14; and Beckmann rearrangement described in Example 15.

Those compounds having structure III wherein A is >C=O or >C=NOH give in the presence of a base or an acid compound of type IV wherein $R_5$ is >C=O or >C=NOH, and $R_6$ is H, acyl, or p-toluenesulfonyl group. These compounds are described in Examples 16 to 18. Compound V may be obtained from Compounds III which have B=O and A=>CHOH by reacting Compounds III with reagents, such as HCl, p-toluenesulfonyl chloride, and the like under anhydrous conditions. This reaction is described in detail in Example 19. Finally, compounds VI are obtained by carrying out the latter reaction in water, lower aliphatic alcohol or amine whereby the lactone ring is cleaved as described in Example 20.

The basic compounds of this invention form pharmaceutically acceptable acid addition salts with mineral acids, such as hydrochloric acid, hydrobromic acid, hydriodic acid, nitric acid, phosphoric acid, and sulfuric acid; and organic acids such as acetic acid, citric acid, tartaric acid, lactic acid, benzenesulfonic acid, toluene sulfonic acid, etc., and these acid addition salts are also included within the scope of this invention.

The following examples are included in order further to illustrate the invention. Temperatures are given in degrees centigrade.

EXAMPLE 1

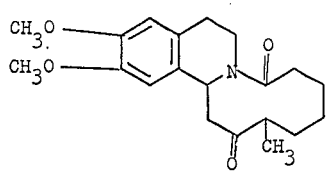

5,6,10,11,12,13,15,15a-octahydro-2,3-dimethoxy-13-methyl-9H-azecino[2,1-a]isoquinoline-8,14-dione A mixture of 12.3 g. of 6,7-dimethoxy-3,4-dihydroisoquinoline and 10 g. of 2-acetyl-2-methylcyclohexanone in 250 ml. of water, is refluxed with stirring for 16 hours. The aqueous portion is decanted from the cooled reaction mixture and the remaining gum is boiled in 70 ml. of acetonitrile and chilled. Filtration and drying of the solid affords 6.5 g. (30%) of 5,6,10,11,12,13,15,15a-octahydro-2,3-dimethoxy-13-methyl - 9H - azecino[2,1-a]isoquinolin-8,14-dione. Recrystallization from acetonitrile yields analytical material. M.P. 240–244°; $\lambda_{max}$ m$\mu$ ($\epsilon$) 285 (18,400); $\lambda_{max}$ 1520 (s.), 1620 (v.s.), 1700 (s.) cm.$^{-1}$.

Analysis.—Calcd. for $C_{20}H_{27}NO_4$ (percent): C, 69.54; H, 7.88; N, 4.05. Found (percent): C, 69.52; H, 7.96; N, 4.24.

EXAMPLE 2

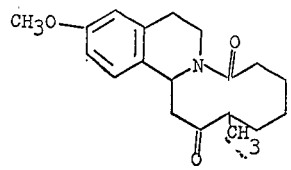

5,6,10,11,12,13,15,15a-octahydro-3-methoxy-13-methyl-9H-azecino[2,1-a]isoquinolin-8,14-dione A solution of 6-methoxy-3,4-dihydroisoquinoline (2 g.) and 2-acetyl-2-methylcyclohexanone (2 g.) in 50 ml. of water is refluxed for 15 hours. An additional 1 g. of 2-acetyl-2-methylcyclohexanone is added and refluxing is continued for a total of 22 hours. The cooled reaction mixture is extracted with 100 ml. of ether. The ethereal solution is washed with dilute hydrochloric acid, dried, concentrated to about 25 ml., and chilled to obtain crystalline 5,6,10,11,12,13,15,15a-octahydro - 3 - methoxy - 13-methyl-9H-azecino[2,1-a]isoquinolin - 8,14 - dione. The crystalline product (0.55 g., 14%) is crystallized from ethyl acetate. M.P. 189–191°; $R_f$ 0.7; $\lambda_{max}$ 1706 (s.), 1615 (v.s.) cm.$^{-1}$.

Analysis.—Calcd. for $C_{19}H_{25}NO_3$ (percent): C, 72.35; H, 7.99; N, 4.44. Found (percent): C, 72.44; H, 8.01; N, 4.53.

EXAMPLE 3

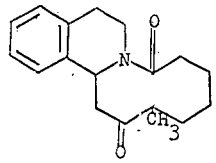

5,6,10,11,12,13,15,15a-octahydro-13-methyl-9H-azecino[2,1-a]isoquinolin-8,14-dione A solution of 3,4-dihydroisoquinoline (2.62 g.) and 2-acetyl-2-methylcyclohexanone (3.08 g.) in 125 ml. of water is refluxed for 22 hours and allowed to cool. The reaction mixture is extracted with 70 ml. of chloroform. The extract is washed with dilute hydrochloric acid, dried and concentrated under reduced pressure to obtain 5,6,10, 11,12,13,15, 15a - octahydro-13-methyl-9H-azecino[2,1-a] isoquinolin-8,14-dione as a residue. The residue is crystallized from isopropanol twice. Yield: 0.1 g. (1.7%); M.P. 151–153°; $\lambda_{max}$ 1730 (s.), 1630 (v.s.) cm.$^{-1}$.

*Analysis.*—Calcd. for $C_{18}H_{23}NO_2$ (percent): C, 75.75; H, 8.12; N, 4.91. Found (percent): C, 75.60; H, 8.03; N, 4.80.

EXAMPLE 4

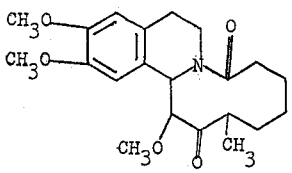

5,6,9,10,11,12,13,14,15,15a-decahydro-2,3,15-trimethoxy-13-methyl-9H-azecino[2,1-a]isoquinolin-8,14-dione A solution of 5,6-dimethoxy-3,4-dihydroisoquinoline (5.2 g.) and 5 g. of 2-methoxyacetyl-2-methyl-cyclohexanone in 125 ml. of water is refluxed for 19 hours. The cooled reaction mixture is acidified with concentrated hydrochloric acid and extracted with chloroform yielding 7.7 g. of non-basic material which is chromatographed on 400 g. of Florisil with ethyl acetate elution to yield: 1.2 g. of 5,6,9,10,11,12,13,14,15,15a-decahydro-2,3,15-trimethoxy - 13 - methyl - 9H - azecino[2,1-a]isoquinolin-8,14-dione (12%); $R_f$ 0.5. Crystallization from ethylacetate affords an analytical sample. M.P. 161.5–163°; $\lambda_{max}$ 1705 (m.), 1635 (s.), 1105 (s.) cm.$^{-1}$.

*Analysis.*—Calcd. for $C_{21}H_{29}NO_5$ (percent): C, 67.18; H, 7.79; N, 3.73. Found (percent): C, 67.09; H, 7.68; N, 4.00.

EXAMPLE 5

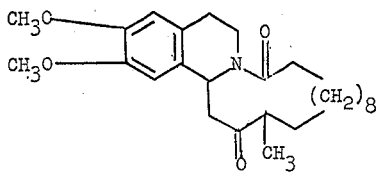

5,6,9,10,11,12,13,14,15,16,17,18,19,20,21,21a- - hexadecahydro-2,3 - dimethoxy - 19 - methyl - 8H - azacyclohexadeca[2,1-a]isoquinolin-8,20-dione (14)

A solution of 6.7-dimethoxy-3,4-dihydroisoquinoline (2.85 g.) and 3.6 g. of 2-acetyl-2-methylcyclododecanone in 60 ml. of water is refluxed for 34 hours. The aqueous phase is decanted from the cooled reaction mixture and the solid is dissolved in benzene and washed with dilute hydrochloric acid and water. The solvent is distilled off and the residue is triturated with Skellysolve "C"; to yield 1.5 g. of 5,6,9,10,11,12,13,14,15,16,17,18,19,20,21,21a-hexadecahydro - 2,3 - dimethoxy - 19 - methyl - 8H-azacyclohexadeca[2,1-a]isoquinolin - 8,20 - dione (14). Crystallization from ethanol affords analytical material. M.P. 129–130°; $\lambda_{max}$ ($\epsilon$) 284 (4,200); $\lambda_{max}$ 1695 (s.), 1630 (v.) cm.$^{-1}$.

*Analysis.*—Calcd. for $C_{26}H_{39}NO_4$ (percent): C, 72.69; H, 9.15; N, 3.26. Found (percent): C, 72.88; H, 9.10; N, 3.18.

EXAMPLE 6

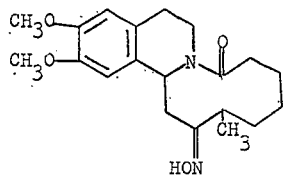

5,6,10,11,12,13,15,15a-octahydro-2,3-dimethoxy-13-methyl-9H-azecino[2,1-a]isoquinoline-8,14-dione 14-oxime A solution of 10 g. of 5,6,10,11,12,13,15,15a-octahydro-2,3-dimethoxy-13-methyl-9H-azecino[2,1-a]isoquinoline-8,14-dione in 750 ml. of 95% ethanol is combined with a solution of 25 g. of $NH_2OH \cdot HCl$ in 150 ml. of $H_2O$, treated with 100 ml. of 10% NaOH and is refluxed for 15 hours. After evaporation of the ethanol in vacuo, the residue is treated with 500 ml. of $H_2O$, made acidic with conc. HCl, and extracted 3 times with 300 ml. portions of chloroform. The chloroform solution is dried and concentrated to dryness in vacuo. Crystallization of the crude oxime from methanol affords 9.1 g. (87%) of 5,6,10,11,12,13,15,15a - octahydro - 2,3 - dimethoxy - 13-methyl - 9H - azecino[2,1-a]isoquinoline - 8,14-dione 14-oxime. Recrystallization from methanol gives the analytical material M.P. 217–220°; $\lambda_{max}$ m$\mu$ ($\epsilon$) 282 (4500), 286 (4500); $\lambda_{max}$ 3200 (m.), 1615 (s.), 1590 (s.), 1520 (m.s.) cm.$^{-1}$.

*Analysis.*—Calcd. for $C_{20}H_{28}N_2O_4$ (percent): C, 66.64; H, 7.83; N, 7.77. Found (percent): C, 66.60; H, 7.80; N, 7.51.

EXAMPLE 7

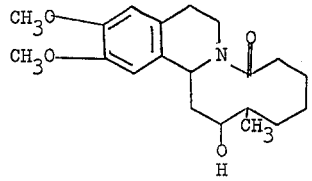

5,6,9,10,11,12,13,14,15,15a-decahydro-14-hydroxy-2,3-dimethoxy-13-methyl-9H-azecino[2,1-a]isoquinolin-8-one A solution of 17.2 g. of 5,6,10,11,12,13,15,15a-octahydro - 2,3 - dimethoxy - 13 - methyl - 9H - azecino[2,1-a] isoquinoline-8,14-dione in 400 ml. of $CHCl_3$ and 400 ml. of $CH_3OH$ is treated, portion-wise, with 9 g. $KBH_4$ and stirred overnight. The solvent is removed in vacuo and the residue is dissolved in 250 ml. of chloroform and 100 ml. of water. The chloroform layer is separated, dried over $Na_2SO_4$ and evaporated, to yield 16.3 g. (94%) of 5,6,9,10,11,12,13,14,15,15a - decahydro - 14 - hydroxy-2,3 - dimethoxy - 13 - methyl - 9H - azecino[2,1-a]isoquinolin-8-one. A two-fold recrystallization from ethylacetate affords analytical material; M.P. 163–194°; $\lambda_{max}$ 284; $\lambda_{max}$ 1515 (s.), 1605 (s.), 3350 (v.w.), 3500 (w.) cm.$^{-1}$

*Analysis.*—Calcd. for $C_{20}H_{29}NO_4$ (percent): C, 69.14; H, 8.41; N, 4.03. Found (percent): C, 68.92; H, 8.54; N, 4.03.

EXAMPLE 8

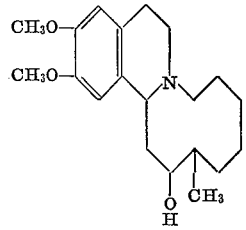

5,6,9,10,11,12,13,14,15,15a-decahydro-2,3-dimethoxy-13-methyl-8H-azecino[2,1-a]isoquinolin-14-ols A solution of 8.7 g. of 5,6,9,10,11,12,13,14,15,15a-decahydro - 14 - hydroxy - 2,3 - dimethoxy - 13 - methyl- 8H-azecino[2,1-a]isoquinolin-8-one in 500 ml. of tetrahydrofuran is treated with 8 g. of LiAlH₄, refluxed for 8 hours, and allowed to stand overnight. Excess LiAlH₄ is destroyed with H₂O, the solids are filtered off and washed with tetrahydrofuran. Combined filtrate and washings are concentrated to dryness under reduced pressure. The residue is dissolved in ethyl acetate and extracted with 3 N HCl. The acid solution is made basic with 10% NaOH and extracted with chloroform. Evaporation of the chloroform solution gives 6.32 g. (80%) of crude isomeric mixture.

Chromatography of a portion of crude product on Florisil (40 g./g.) with ethyl acetate affords isomer A ($R_f$ 0.7) which is dissolved in dilute HCl and treated with an excess of 17% perchloric acid. The precipitated perchloric acid salt is recrystallized from isopropanol. M.P. 160°.

*Analysis.*—Calcd. for $C_{20}H_{31}NO_3 \cdot HClO_4$ (percent): C, 55.36; H, 7.43; N, 3.23; Cl, 8.17. Found (percent): C, 55.62; H, 7.33; N, 3.47; Cl, 8.39.

$\lambda_{max.}$ 3400 (m.), 3100 (w.), 1610 (w.), and 1525 (m.) cm⁻¹.

Chromatography of a portion of crude product on silica gel (100 g./g.) with ethyl acetate affords chromatographically pure isomer B as gum ($R_f=0.85$). The hydrochloride salt, prepared by dissolving the gum in ethyl acetate and treating with ethereal hydrogen chloride, is crystallized from isopropanol three times to give the analytical sample. M.P. 183–185°; $\lambda_{max.}$ 3300 (s.), 2550 (m.), 1610 (w.), 1520 (s.) cm⁻¹.

*Analysis.*—Calcd. for $C_{20}H_{31}NO_3 \cdot HCl$ (percent): C, 64.94; H, 8.72; N, 3.79; Cl, 9.58. Found (percent): C, 65.06; H, 8.88; N, 4.09; Cl, 9.35.

EXAMPLE 9

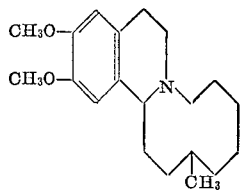

5,6,9,10,11,12,13,14,15,15a-decahydro-2,3-dimethoxy-13-methyl-8H-azecino[2,1-a]isoquinoline perchlorate A solution of 3 g. of 5,6,9,10,11,12,13,14,15,15a-decahydro-14-hydroxy-2,3-dimethoxy-13-methyl - 8H - azecino[2,1-a]isoquinoline-8-one p-toluenesulfonate in 250 ml. of tetrahydrofuran is treated with 3 g. of LiAlH₄ and refluxed for 4 hours. Excess LiAlH₄ is destroyed by addition of H₂O. The solids are filtered off and washed with hot tetrahydrofuran. Combined filtrate and washings are concentrated under reduced pressure. The oily residue is dissolved in ether and extracted with 2 N HCl. The acid solution is made basic with 10% NaOH and extracted with CHCl₃. Drying and evaporation of the CHCl₃ solution yields the crude product. Chromatography on 30 g. of Florisil with ethyl acetate as the eluant affords chromatographically pure material ($R_f$ 0.9) which is dissolved in 10 ml. of methanol and treated with 2 ml. of 70% perchloric acid. After evaporation of the methanol the residue is triturated with cold water and crystallized from isopropanol to yield 1.42 g. (51%) of 5,6,9,10,11,12,13,14,15,15a-decahydro - 2,3 - dimethoxy-13-methyl-8H-azecino[2,1-a]isoquinoline perchlorate. M.P. 161–163°. Recrystallization from isopropanol affords analytical material M.P. 162–165°. (Dried at 140°/0.1 mm. 5 hr.).

*Analysis.*—Calcd. for $C_{20}H_{31}NO_2 \cdot HClO_4$ (percent): C, 57.48; H, 7.72; N, 3.35; Cl, 8.48. Found (percent): C, 57.24; H, 7.88; N, 3.61; Cl, 8.60.

EXAMPLE 10

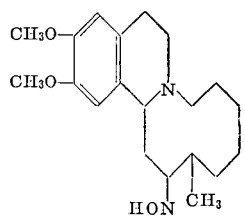

5,6,9,10,11,12,13,14,15,15a-decahydro - 2,3 - dimethoxy-13-methyl-8H-azecino[2,1-a]isoquinoline-14-one oxime A solution of 10 g. of 5,6,10,11,12,13,15,15a-octahydro-2,3-dimethoxy-13-methyl - 9H - azecino[2,1-a]isoquinoline-8,14-dione 14-oxime in one l. of tetrahydrofuran is allowed to cool, treated with 5 g. of LiAlH₄ and stirred at room temperature for 3.5 hours. Excess LiAlH₄ is destroyed with water, the inorganic material is filtered off and washed with hot tetrahydrofuran. Combined and dried filtrate and washings are evaporated to dryness. The oily residue (10 g.) is dissolved in ethyl acetate, and adsorbed on a 250 g. Florisil column. Elution with ethyl acetate followed by chloroform yields 7.7 (80%) of 5,6,9,10,11,12,13,14,15,15a-decahydro - 2,3 - dimethoxy-13-methyl-8H-azecino[2,1-a]isoquinoline - 14 - one oxime. The analytical sample is prepared by dissolving in hot "Skelly B" and allowing the solution to cool. M.P. 65–90°; δ p.p.m. d. 1.05 (CH₃—CH), 3.84 (CH₃O), multiplet in 3.8–4.2 area (H–15a, equatorial H–6), 6.60, 7.07 (aromatic H); $\lambda_{max.}$ mμ (ε) 281 (4160); $\lambda_{max.}$ 3200 (m.), 1605 (w.), 1510 (s.) cm.⁻¹.

*Analysis.*—Calcd. for $C_{20}H_{30}N_2O_3$ (percent): C, 69.33; H, 8.73; N, 8.09. Found (percent): C, 69.25; H, 8.65; N, 8.19.

EXAMPLE 11

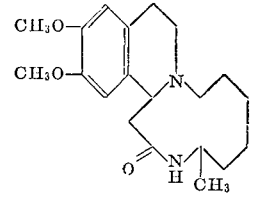

5,6,8,9,10,11,12,13,14,15,16,16a-dedecahydro - 2,3 - dimethyl-13-methylisoquino[2,1-a][1,5]diazacycloundecin-15 one A solution of 3.68 g. of 5,6,9,10,11,12,13,14,16,16a-decahydro-2,3-dimethoxy - 13 - methylisoquino[2,1-a][1,5] diazacycloundecine-8,15-dione in 400 ml. of tetrahydrofuran is chilled, treated with 3.6 g. of LiAlH₄, and stirred at room temperature for 3 hours. Excess LiAlH₄ is destroyed with water with external cooling. The reaction mixture is filtered, and the cake is washed several times with tetrahydrofuran. The combined filtrate and washings are dried and evaporated under reduced pressure. The residue is crystallized from aqueous ethanol to yield 2.5 g. (71%) of analytically pure 5,6,8,9,10,11,12,13,14,15,16,16a-dodecahydro - 2,3 - dimethoxy-13-methylisoquino [2,1-a][1,5]diayacycloundecin-15-one. M.P. 173–175°; $\lambda_{max.}$ mμ (ε) 282 (4400); 286 (4400); $\lambda_{max.}$ 3300 (m.), 1630 (s.), 1540 (m.), 1515 (m.s.) cm.⁻¹.

*Analysis.*—Calcd. for $C_{20}H_{30}N_2O_3$ (percent): C, 69.33; H, 8.73; N, 8.09. Found (percent): C, 69.12; H, 9.03; N, 7.99.

EXAMPLE 12

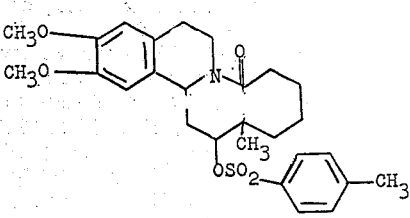

5,6,9,10,11,12,13,14,15,15a - decahydro-14-hydroxy-2,3-dimethoxy-13-methyl-8H-azecino[2,1 - a]isoquinoline-8-one-p-toluenesulfonate A solution of 10 g. of 5,6,9,10,11,12,13,14,15,15a-decahydro - 14 - hydroxy - 2,3 - dimethoxy - 13 - methyl-9H-azecino[2,1-a]isoquinoline-8-one in 250 ml. of pyridine is treated dropwise (45 min.) with a solution of 11.4 g. of p-toluenesulfonyl chloride in 100 ml. of pyridine, and is stirred at room temperature for 22 hours. The reaction mixture is concentrated under reduced pressure at a temperature not to exceed 40°. The residue is dissolved in 250 ml. of chloroform, washed consecutively with dilute HCl, 5% sodium hydroxide solution and H$_2$O. Drying and evaporation of the chloroform solution yields 13.2 g. of 5,6,9,10,11,12,13,14,15a - decahydro - 14 - hydroxy-2,3-dimethoxy-13-methyl - 8H - azecino[2,1-a]isoquinoline-8-one p-toluenesulfonate. Crystallization from 100 ml. isopropanol affords 3 g. (21%) of the product. Crystallization from ethyl acetate yields analytical material, M.P. 165–166°, R$_f$ 0.5; λ$_{max}$ 1635(s.), 1520 (m.), 915(v.s.) cm.$^{-1}$.

Analysis.—Calcd. for C$_{27}$H$_{35}$NO$_6$S (percent): C, 64.65; H, 7.03; N, 2.79. Found (percent): C, 64.70; H, 7.15; N, 3.06.

EXAMPLE 13

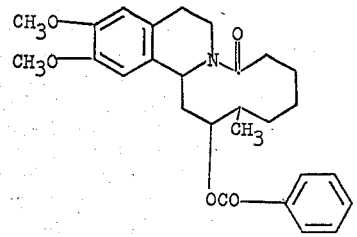

5,6,9,10,11,12,13,14,15,15a -decahydro - 14-hydroxy-2,3-dimethoxy - 13 - methyl-8H-azecino 2,1-a] isoquinoline-8-one benzoate A cooled solution of 0.3 g. 5,6,9,10,11,12,13,14,15,15a-decahydro - 14 - hydroxy - 2,3 - dimethoxy - 13 - methyl-8H-azecino[2,1-a]isoquinolin-8-one in 25 ml. of pyridine is treated dropwise with a solution of 2 ml. of benzoyl chloride in 51 ml. of pyridine. After standing for 4 days at room temperature the reaction mixture is concentrated in vacuo and the residue is dissolved in 50 ml. of chloroform and washed consecutively with water, in HCl and water. The chloroform solution is dried (Na$_2$SO$_4$) and evaporated. The residue is taken up in ethyl acetate and passed through a short Florisil column. Evaporation of eluate yields 0.34 g. (85%) of crude 5,6,9,10,11,12,13,-14,15,15a - decahydro - 14 - hydroxy - 2,3-dimethoxy-13-methyl-8H-azecino[2,1 - a]isoquinolin-8-one Benzoate in the form of an oil. Crystallization from ethyl acetate affords analytical material M.P. 182–184° C.; λ$_{max}$ cm.$^{-1}$. 1715 (s.), 1620 (s.).

Analysis.—Calcd. for C$_{27}$H$_{33}$HO$_5$ (percent): C, 71.81; H, 7.37; N, 3.10. Found (percent): C, 71.73; H, 7.57; N, 3.40.

EXAMPLE 14

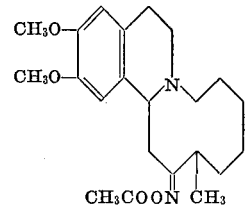

5,6,8,9,10,11,12,13,14,15a - decahydro-2,3-dimethoxy-13-methyl-14H-azecino[2,1-a]isoquinolin-14-one O-acetyl oxime A solution of 2 g. of 5,6,9,10,11,12,13,14,15,15a-decahydro - 2,3 - dimethoxy - 13 - methyl-8H-azecino[2,1-a]isoquinoline-14-one oxime in 50 ml. of pyridine is treated with 5 ml. of acetic anhydride and allowed to stand at room temperature overnight. The reaction is concentrated on a rotary evaporator below 60°. The solution of the residue in 50 ml. of ethyl acetate is washed with 5% NaOH then with water and is evaporated under reduced pressure. Trituration of the residue with petroleum ether yields 1.86 (83%) of crude 5,6,8,9,10,11,12,-13,14,15a - decahydro - 2,3 - dimethoxy - 13-methyl-14H-azecino[2,1-a]isoquinolin-14-one O-acetyl oxime. A twofold crystallization from anhydrous ether affords analytical material M.P. 131–133°; λ$_{max}$ 1750 cm.$^{-1}$, δ p.p.m. d. 1.12 (CH$_3$—CH), 2.23 CH$_3$CO), 3.85 (CH$_3$O), multiplet in 3.8–4.2 area (H–15a, equatorial H–6), 6.58, 6.58 (aromatic H).

Analysis.—Calcd. for C$_{22}$H$_{32}$N$_2$O$_4$ (percent): C, 68.01; H, 8.30; N, 7.27. Found (percent): C, 68.07; H, 8.39; N, 7.51.

EXAMPLE 15

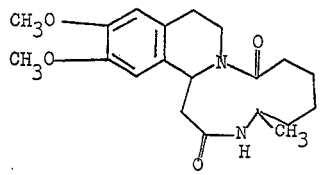

5,6,9,10,11,12,13,14,16,16a - decahydro - 2,3-dimethoxy-13 - methylisoquino[2,1 - a][1,5]diazacycloundecine-8,15-dione Powdered 5,6,10,11,12,13,15,15a - octahydro - 2,3-dimethoxy - 13 - methyl - 9H - azecino[2,1-a]isoquinolin-8,14 - dione 14 oxime (5 g.) is added to polyphosphoric acid (100 g.) and heated on a steam bath (95–100°) stirring occasionally for 0.5 hr. After cooling, and dilution with one l. of ice water with vigorous stirring, the mixture is extracted with CHCl$_3$. Evaporation of combined and dried extracts yields the crude 5,6,9,10,11,12, 13,14,16,16a - decahydro - 2,3 - dimethoxy - 13 - methylisoquino[2,1-a][1,5]diazacycloundecine-8,15-dione which is crystallized from 100 ml. of ethyl acetate to yield 4.05 g. (81%) of chromatographically pure material. Recrystallization from acetonitrile gives analytical material. M.P. 252–255°; λ$_{max}$ mμ (ε), 282 (4550), 286 (4590); λ$_{max}$ 3450 (w.), 3350 (m.s.), 3300 (w.), 1160 (s.), 1630 (s.), 1545 (s.), 1515 (s.) cm.$^{-1}$.

Analysis.—Calcd. for C$_{20}$H$_{28}$N$_2$O$_4$ (percent): C, 66.64; H, 7.83; N, 7.77. Found (percent): C, 66.73; H, 7.69; N, 7.63.

EXAMPLE 16

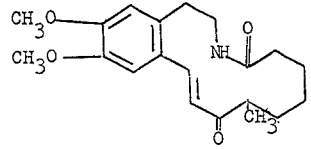

1,2,5,6,7,8-hexahydro-14,15-dimethoxy-9-methyl-3-benzazacyclotetradecine-4,10(3H,9H)-dione A solution of 5 g. of 5,6,10,11,12,13,15,15a-octahydro 2,3 - dimethoxy - 1 3 - methyl - 9H - azecino[2,1-a]

isoquinoline-8,14-dione in 125 ml. ethanol is treated with 6.5 ml. of a 0.17 N solution of sodium in ethanol, and refluxed for 1.5 hr. with exclusion of moisture. The solvent is removed in vacuo and the residue is dissolved in 125 ml. of CHCl$_3$ and washed twice with H$_2$O. Drying and concentration of the solution yields crude 1,2,5,6,7,8-hexahydro - 14,15 - dimethoxy - 9 - methyl - 3 - benzazacyclotetradecine - 4,10(3H,9H) - dione. Crystallization from 95% ethanol and recrystallization from ethyl acetate affords 0.56 g. (11.2%) of analytical material. M.P. 188–190°; $\lambda_{max}$ ($\epsilon$) plateau 222 (11,700), 246 (11,200), shoulder 305 (11,700), 339 (16,000); $\lambda_{max}$ 3330 (m.), 1660 (s.), 1640 (s.), 1600 (s.) 1535 (m.), 1525 (s.) cm.$^{-1}$.

Analysis.—Calcd. for C$_{20}$H$_{27}$NO$_4$ (percent): C, 69.54; H, 7.88; N, 4.06. Found (percent): C, 69.77; H, 8.02; N, 4.13.

EXAMPLE 17

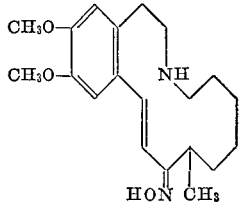

1,2,3,4,5,6,7,8-octahydro-14,15-dimethoxy-9-methyl-3-benzazacyclotetradecin-10(9H)-one oxime The solution of 5,6,9,10,11,12,13,14,15,14a - decahydro-2,3 - dimethoxy - 13 - methyl - 8H - azecino[2,1-a]isoquinoline-14-one oxime (3,6 g.) in 50 cc. of 3 N HCl is stirred at room temperature for 1 hour. The acidic suspension is made basic with 10% NaOH and extracted with CHCl$_3$. The dried chloroform solution is evaporated in vacuo. The residue is crystallized from 50 ml. of ethyl acetate to yield 1.0 g. (28%) of 1,2,3,4,5,6,7,8-octahydro - 14,15 - dimethoxy - 9 - methyl - 3 - benzazacyclotetradecin - 10(9H) - one oxime. Evaporation of the ethyl acetate mother liquor and treatment of the residue with 20 cc. of 6 N HCl for 2 hours at room temperature afforded an additional 0.9 g. (25%) of 1,2,3,4,5,6,7,8-octahydro - 14,15 - dimethoxy - 9 - methyl-3 - benzazacyclotetradecin - 10(9H) - one oxime. An analytical sample is prepared by a single crystallization from methanol. M.P. 199–202° (dec.); δ p.p.m. d. 1.15 (CH$_3$—CH), 382 (CH$_3$O), 6.88, 7.20, 7.29 (ca. 1:1:2, H–11, H–12, H–13, H–16); $\lambda_{max}$ mμ ($\epsilon$) 221 (13,500), 238 (12,400), 295 (15,800), 325 (16,800); $\lambda_{max}$ 3300 (m.), 2650 (m.), 1600 (m.), 1510 (s.) cm.$^{-1}$.

Analysis.—Calcd. for C$_{20}$H$_{30}$N$_2$O$_3$ (percent): C, 69.33; H, 8.73; N, 8.09. Found (percent): C, 69.28; H, 8.85; N, 8.32.

EXAMPLE 18

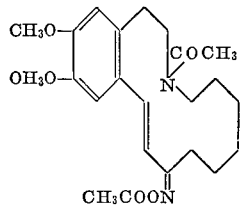

3 - acetyl - 1,2,3,4,5,6,7,8 - octahydro - 14,15 - dimethoxy-9 - methyl - 3 - benzazacyclotetradecin - 10(9H) - one O-acetyl oxime A solution of 1.8 g. of 1,2,3,4,5,6,7,8 - octahydro-14,15-dimethoxy - 9 - methyl - 3 - benzazacyclotetradecin-10(9H)-one oxime in 50 ml. of pyridine is treated with 5 ml. of acetic anhydride and allowed to stand overnight. Concentration under reduced pressure yields an oily residue which is triturated with cold H$_2$O and dissolved in chloroform. The solution is washed with water, dried and concentrated in vacuo to yield 1.16 g. (52%) of 3-acetyl-1,2,3,4,5,6,7,8 - octahydro - 14,15 - dimethoxy - 9 - methyl-3 - benzazacyclotetradecin - 10(9H) - one O-acetyl oxime. Two fold crystallization from ethyl acetate gives analytical material. M.P. 59–62°; $\lambda_{max}$ ($\epsilon$) shoulder 224 (14,500) 242 (14,900), plateau 303 (13,800), 336 (17,700); $\lambda_{max}$ cm.$^{-1}$ 1750 (s.), 1635 (s.); δ p.p.m. d. 1.32 (CH$_3$—CH), 2.12 (CH$_3$CON), 2.23 (CH$_3$COO), 3.93 (CH$_3$O), 6.75, 6.87, 7.15, 7.38 (four protons, AB quartet superimposed on two singlets, H–11, H–12, H–13, H–16).

Analysis.—Calcd. for C$_{24}$H$_{34}$N$_2$O$_5$ (percent): C, 66.95; H, 7.96; N, 6.51. Found (percent): C, 67.22; H, 7.96; N, 6.65.

EXAMPLE 19

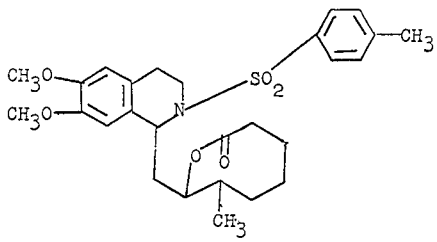

1,2,3,4-tetrahydro-3-hydroxy-6,7-dimethoxy-ε-methyl-2-(p-tolylsulfonyl)-1-isoquinolineoctanoic acid 3-lactone A solution of 10 g. (0.029 m.) of 5,6,9,10,11,12,13,14, 15,15a - decahydro - 14 - hydroxy - 2,3 - dimethoxy-13 - methyl - 9H - azecino[2,1-a]isoquinolin - 8 - one in 250 ml. of pyridine is treated dropwise (45 min.) with a solution of 11.4 g. (0.06 m.) of p-toluenesulfonyl chloride in 100 ml. of pyridine, and is stirred at room temperature for 22 hours. The reaction mixture is concentrated under reduced pressure at temperatures not exceeding 40°. The residue is dissolved in 250 ml. of chloroform, washed consecutively with dilute HCl, 5% sodium hydroxide solution and H$_2$O. Drying and evaporation of the chloroform solution yields 13.2 g. of 1,2,3,4-tetrahydro - 3 - hydroxy - 6,7 - dimethoxy - (ε) - methyl-2 - (p - tolylsulfonyl) - 1 - isoquinolineoctanoic acid 3-lactone. Crystallization from 100 ml. isopropanol affords 3 g. (21%) of 5,6,9,10,11,12,13,14,15,15a - decahydro - 14 - hydroxy - 2,3 - dimethoxy - 13 -methyl - 8H-azecino[2,1-a]isoquinoline-8-one p-toluenesulfonate.

A second crop of crystalline material from the isopropanol mother liquor gives on recrystallization from ethyl acetate, 0.88 g. (6%) of lactone; M.P. 189–190°; R$_f$ 0.8; $\lambda_{max}$ 1720 cm.$^{-1}$ (s.); δ p.p.m. d. 0.93 (CH$_3$—CH), 2.27 (CH$_3$—C$_6$H$_4$), 3.73, 3.84 (CH$_3$O), two proton multiplet in 4.3–4.8 area (equatorial H–3, 3–H), q. 5.15 (H–1, J$_{ab}$ 12 cps., J$_{ab}$ 3.5 cps.), 6.28, 6.57 (dimethoxybenzene aromatic protons); 6.98, 7.12, 7.48, 7.63 (toluene aromatic protons).

Analysis.—Calcd. for C$_{27}$H$_{35}$NO$_6$S (percent): C, 64.65; H, 7.03; S, 6.30. Found (percent): C, 64.88; H, 7.05; S, 6.28.

EXAMPLE 20

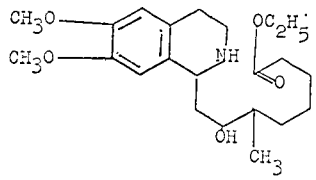

Ethyl 1,2,3,4-tetrahydro-3-hydroxy-6,7-dimethoxy-ε-methyl-1-isoquinoline octanoate.

A slow stream of dry HCl is passed for 40 min. through a solution of 7.2 g. of 5,6,9,10,11,12,13,14,15,15a-decahydro-14-hydroxy - 2,3 - dimethoxy - 13 - methyl - 9H-azecino[2,1-a]isoquinolin-8-one in 350 ml. of ethanol containing chloroform. The mixture is allowed to stand overnight and the solvent is removed in vacuo at room temperature. Chloroform is added and the evaporation is repeated. The glossy residue is treated with 200 ml. of ethyl acetate. The crystalline precipitate is filtered off and the filtrate is extracted with three 70 ml. portions of water.

The aqueous extracts are combined, made basic with saturated sodium bicarbonate solution, and extracted with chloroform. The chloroform extracts are dried and evaporated and the residue is recrystallized from ethyl acetate to yield 2.68 g. (39%) of ethyl 1,2,3,4-tetrahydro-3-hydroxy - 6,7 - dimethoxy - $\epsilon$ - methyl - 1 - isoquinoline octanoate; M.P. 82–83°; $\lambda_{max}$ 1520 (v.s.), 1610 (m.s.), 1730 (v.s.), 3100 (m.), 3300 (m.), cm.$^{-1}$, $\lambda_{max}$ m$\mu$ ($\epsilon$) shoulder 223 (3100), 282 (3800), 286 (3800); $\delta$ p.p.m., d. 0.88 ($CH_3$—CH), t, 1.22 ($CH_3$—$CH_2$), 3.83 ($CH_3O$), q. 4.12 ($CH_3$—$CH_2$), t. 4.39 (isoquinoline H–1); 6.56 6.60 (aromatic H).

*Analysis.*—Calcd. for $C_{22}H_{35}NO_5$ (percent): C, 67.14; H, 8.97; N, 3.56. Found (percent): C, 67.42; H, 9.02; N, 3.63.

It is understood that the foregoing detailed description is given merely by way of illustration and that many variations may be made therein without departing from the spirit of our invention.

Having described our invention, what we desire to secure by Letters Patent is:

1. A compound of the formula:

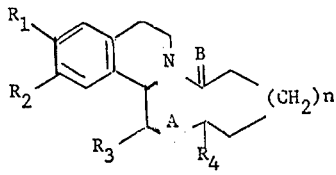

wherein B is oxygen or $H_2$; A is $>$CHOH, $>$CHOSO$_2$C$_6$H$_4$CH$_3$

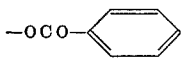

$>$C=O, $>$CH$_2$, $>$C=NOH, $>$C=NOCOCH$_3$, $>$CONH; $R_1$ and $R_2$ are hydrogen, lower alkoxy, or hydroxy; $R_3$ is hydrogen, lower alkyl, or lower alkoxy; $R_4$ is lower alkyl; and n is 1 to 8, and the pharmaceutically acceptable acid addition salts thereof.

2. The compound of claim 1 which is: 5,6,10,11,12,13, 15,15a-octahydro-2,3-dimethoxy-13-methyl - 9H - azecino [2,1-a]isoquinoline-8,14-dione.

3. The compound of claim 1 which is: 5,6,10,11,12,13, 15,15a - octahydro - 3 - methoxy-13-methyl-9H-azecino [2,1-a]isoquinolin-8,14-dione.

4. The compound of claim 1 which is: 5,6,10,11,12,13, 15,15a - octahydro - 13 - methyl - 9H - azecino [2,1-a] isoquinolin-8,14-dione 5. The compound of claim 1 which is: 5,6,9,10,11,12,13, 14,15,15a - decahydro - 2,3,15 - trimethoxy - 13 - methyl-9H-azecino[2,1-a]isoquinolin-8,14-dione.

6. The compound of claim 1 which is: 5,6,9,10,11,12, 13,14,15,16,17,18,19,20,21,21a - hexadecahydro - 2,3 - dimethoxy - 19 - methyl - 8H - azacyclohexadeca[2,1-a]isoquinolin-8,20-dione (14).

7. The compound of claim 1 which is: 5,6,10,11,12, 13,15,15a - octahydro - 2,3 - dimethoxy - 13 - methyl - 9H-azecino[2,1-a]isoquinoline-8,14-dione, 14-oxime.

8. The compound of claim 1 which is: 5,6,9,10,11,12, 13,14,15,15a - decahydro - 14 - hydroxy - 2,3 - dimethoxy-13-methyl-9H-azecino[2,1-a]isoquinolin-8-one.

9. The compound of claim 1 which is: 5,6,9,10,11,12, 13,14,15,15a - decahydro - 2,3 - dimethoxy - 13 - methyl-8H-azecino[2,1-a]isoquinolin-14-ols.

10. The compound of claim 1 which is: 5,6,9,10,11, 12,13,14,15,15a - decahydro - 2,3 - dimethoxy - 13 - methyl-8H-azecino[2,1-a]isoquinoline perchlorate.

11. The compound of claim 1 which is: 5,6,9,10,11,12, 13,14,15,15a - decahydro - 2,3 - dimethoxy - 13 - methyl-8H-azecino[2,1-a]isoquinoline-14-one oxime.

12. The compound of claim 1 which is: 5,6,9,10,11, 12,13,14,15,15a - decahydro - 14 - hydroxy - 2,3 - dimethoxy - 13 - methyl - 8H - azecino[2,1-a]isoquinoline-8-one p-toluenesulfonate.

13. The compound of claim 1 which is: 5,6,9,10,11,12, 13,14,15,15a - decahydro - 14 - hydroxy - 2,3 - dimethoxy-13-methyl-8H-azecino[2,1-a]isoquinoline-8-one benzoate.

14. The compound of claim 1 which is: 5,6,8,9,10,11, 12,13,14,15a - decahydro - 2,3 - dimethoxy - 13 - methyl-14H-azecino[2,1-a]isoquinolin-14-one O-acetyl oxime.

15. A process for the production of a compound of the formula:

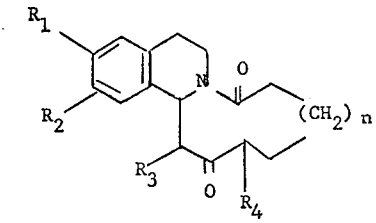

wherein $R_1$ and $R_2$ are hydrogen, lower alkoxy or hydroxy; $R_3$ is hydrogen, lower alkyl or lower alkoxy; $R_4$ is lower alkyl and n is 1 to 8; which comprises contacting a compound of the Formula I with a compound of the Formula II:

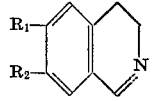

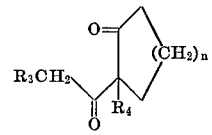

at the temperature from about 80–100° C. in a lower molecular weight alcohol or water.

References Cited

UNITED STATES PATENTS 3,426,027    2/1969    Muller _____ 260—289

DONALD G. DAUS, Primary Examiner

U.S. Cl. X.R.

260—239, 239.3, 287, 288, 289, 544, 586; 424—258